(12) United States Patent
Van Rafelghem et al.

(10) Patent No.: US 11,815,738 B2
(45) Date of Patent: Nov. 14, 2023

(54) DEVICE FOR ELASTIC PIVOTING ABOUT TWO ORTHOGONAL AXES

(71) Applicant: BARCO N.V., Kortrijk (BE)

(72) Inventors: Winter Van Rafelghem, Kortrijk (BE); Bart Van Den Bossche, Kuurne (BE)

(73) Assignee: BARCO N.V., Kortrijk (BE)

( * ) Notice: Subject to any disclaimer, the term of this patent is extended or adjusted under 35 U.S.C. 154(b) by 798 days.

(21) Appl. No.: 16/960,591

(22) PCT Filed: Jan. 14, 2019

(86) PCT No.: PCT/EP2019/050841
§ 371 (c)(1),
(2) Date: Jul. 8, 2020

(87) PCT Pub. No.: WO2019/138115
PCT Pub. Date: Jul. 18, 2019

(65) Prior Publication Data
US 2021/0003814 A1    Jan. 7, 2021

(30) Foreign Application Priority Data

Jan. 12, 2018   (EP) .................................... 18151537

(51) Int. Cl.
G02B 7/182   (2021.01)
B33Y 10/00   (2015.01)
B33Y 80/00   (2015.01)

(52) U.S. Cl.
CPC .............. *G02B 7/182* (2013.01); *B33Y 10/00* (2014.12); *B33Y 80/00* (2014.12)

(58) Field of Classification Search
None
See application file for complete search history.

(56) References Cited

U.S. PATENT DOCUMENTS 6,856,437 B2 *   2/2005   Witt .................... G02B 7/1821
                                                            359/200.7
2007/0139752 A1   6/2007   Bernstein et al.
2012/0250124 A1   10/2012  Choi et al.
2014/0340726 A1   11/2014  Gu-Stoppel et al.
(Continued)

FOREIGN PATENT DOCUMENTS

EP   2455795 A1   5/2012

OTHER PUBLICATIONS

International Preliminary Report on Patentability in corresponding PCT Application No. PCT/EP2019/050841, dated Jul. 14, 2020.
(Continued)

*Primary Examiner* — Jennifer D. Carruth
(74) *Attorney, Agent, or Firm* — HAMRE, SCHUMANN, MUELLER & LARSON, P.C.

(57) ABSTRACT

A device for elastic pivoting about two orthogonal axes as well a method of manufacturing thereof using additive manufacturing processes. The device can be used in a projector, such as a back projector, a scanner such as a laser scanner, or other forms of displays, or a telescope etc. The device includes an inner frame and an outer frame. First and second flexible spring elements extend out of the plane in which the inner frame lies and third and fourth flexible spring elements extend out of the plane in which the outer frame lies.

16 Claims, 5 Drawing Sheets

(56) References Cited

U.S. PATENT DOCUMENTS

2017/0081050 A1 3/2017 Gans et al.
2021/0380401 A1* 12/2021 Drabe ............... G02B 26/0841

OTHER PUBLICATIONS

International Search Report and Written Opinion in corresponding PCT/EP2019/050841 dated Mar. 7, 2019.
Partial European Search Report in corresponding European Application No. 18151537.0 dated Jul. 10, 2018.
European Search Report in corresponding European Application No. 18151537.0 dated Oct. 19, 2018.
Youmin Wang et al., Magnetic-Actuated Stainless Steel Scanner for Two-Photon Hyperspectral Fluorescene Microscope, Journal of Microelectromechanical Systems, vol. 23, No. 5, Oct. 2014, pp. 1208-1218.
Mohammad Vaezi et al., A Review on 3D Micro-Additive Manufacturing Technologies, International Journal of Advanced Manufacturing Technology, Jul. 2012, 37 pages.
Li-Anne Liew et al., Fabrication of Multi-Layered Sicn Ceramic Mems Using Photo-Polymerization of Precursor, NSF Center for Advanced Manufacturing and Packaging of Microwave, Optical, and Digital Electronics, Department of Mechanical Entineering, Jan. 25, 2001, IEEE, pp. 86-89.
Janset SAVAS et al., Toward Fully Three-Dimensional-Printed Miniaturized Confocal Imager, Optical Engineering 57(4), 041402, Jan. 6, 2018, XP060101792, pp. 041402-1-041402-7.

* cited by examiner

DEVICE FOR ELASTIC PIVOTING ABOUT TWO ORTHOGONAL AXES

The present invention relates to a device for elastic pivoting about two orthogonal axes and a method of manufacturing thereof. The device can be used in a projector, such as a back projector, a scanner such as a laser scanner, or other forms of displays, or a telescope etc.

TECHNICAL BACKGROUND

US2017/081050 discloses a cradle produced by additive manufacturing for a gyroscopic actuator with a gimbal guided by two bearings, or guide elements, on each side of a flywheel. A gimbal subassembly is made up of the cradle and the flywheel. The flywheel is rotational mobile with respect to the cradle about a first axis. A first bearing is positioned at the first end of the cradle and a second bearing is positioned at the second end of the cradle, the first and second bearings being configured to render the cradle rotationally mobile about a second axis of rotation substantially perpendicular to the first axis of rotation.

SUMMARY OF THE INVENTION

The present invention discloses a device for elastic pivoting about two orthogonal axes and a method of manufacturing thereof. The device can be used in a projector, such as a back projector, a scanner such as a laser scanner, or other forms of displays or in a camera e.g. a drone camera, or a telescope or other optical instruments, or other systems which need elastic pivoting about two orthogonal axes.

In one aspect a device for elastic pivoting about two orthogonal axes is provided, comprising an inner frame concentric with an outer frame, a first and a second flexible spring element, the first and second flexible spring elements each having proximal and distal ends, the proximal end of the first spring element being integrally formed with the inner frame and the distal end of the first spring element being integrally formed with the outer frame and being located diagonally opposite to the second spring element, the proximal end of the second spring element being integrally formed with the inner frame and the distal end of the second spring element being integrally formed with the outer frame, a third and a fourth flexible spring element, the third and fourth flexible spring elements each having proximal and distal ends, the proximal end of the third spring element being integrally formed with the outer frame and being located diagonally opposite to the fourth spring element, the proximal end of the fourth spring element being integrally formed with the outer frame, the first to fourth flexible spring elements being placed so that the first and second flexible spring elements provide elastic rotation of the inner frame with respect to the outer frame about a first axis and the third and fourth flexible spring elements provide elastic rotation of the outer frame about a second axis orthogonal with the first axis.

The inner frame need not be the same shape as the outer frame, for example in the inner frame could be a circle and the outer frame a square, or the outer frame a rectangle and the inner frame an ellipse.

The inner frame can be co-planar with the outer frame when at rest or tension-free. Concentric does not mean co-planar outer and inner frames. The device can have co-planar first and second frames for some applications.

As the spring elements are made in an integral manner with the frames and other components the number of individual parts required is much less than conventional devices.

Any of the first to fourth spring elements are arcuate or bowed. This lowers the force required to move one frame relative to another. The inner frame is concentric with an outer frame, The first to fourth flexible spring elements preferably extend out of the plane formed by the associated inner or outer frame. The arcuate or bowed form of the first to fourth spring elements create for each element an arch that either extends between the inner frame and the outer frame or between the outer frame and a connector or fixing to a housing with the top of the arch not in the same plane as the first or second frame respectively. The first and second flexible spring elements each have proximal and distal ends. The proximal end of the first spring element extends away from the inner frame and out of the plane in which the inner frame lies. The distal end of the first spring element extends away from the outer frame and out of a plane in which the outer frame lies. Located diagonally opposite to the first spring element on the inner frame is the second spring element, the proximal end of the second spring element extending away from the inner frame and out of the plane in which the inner frame lies and the distal end of the second spring element extends away from the outer frame and out of the plane in which the outer frame lies.

The device also has third and fourth flexible spring elements, the third and fourth flexible spring elements each having proximal and distal ends, the proximal end of the third spring element extending away from the outer frame and out of a plane in which the outer frame lies. Located diagonally opposite to the third spring is the fourth spring element, the proximal end of the fourth spring element being integrally formed with the outer frame.

This has the advantage that the outer periphery of the inner frame can be very close to the inner surface of the outer frame. Also the outer surface of the outer frame can be close to the inner wall of the connector or fixings or a housing. If any of the first to fourth spring elements were in the same plane as the first or second frame then it or they would need to be accommodated in a space between the inner and outer frame or between the outer frame and the inner wall of the housing.

An out-of-plane spring is not parallel to the plane of the structure to be pivoted (like e.g. the inner and outer frames of the mechanism under consideration). This has the advantage that the outer periphery of the inner frame can be very close to the inner surface of the outer frame. The consequence of this is that an out-of-plane arcuate or bow shaped spring has an advantage compared to planar springs which lie within the plane or substantially within the plane of the structure that must be pivoted, e.g. the inner or outer frame (like e.g. a zigzag shaped spring) is that the distance between the two ends of the spring can be shorter. This is particularly advantageous when the lateral dimensions of the pivoting mechanism are limited. Even at rest, the spring will have sections that are not parallel with the pivoting structure as illustrated in FIGS. 1 to 5.

This advantage can be used:
 (a) To decrease the distance between the two ends of the spring and in particular the distance between the attachment point between the spring and a support structure or a frame) while keeping the spring constant unchanged.
 (b) To decrease the spring constant (and the stress in the spring) while keeping the same distance between the two ends of the spring.

Examples of planar springs can be found e.g. in US2007139752, US2014340726 and EP2455795. As can be seen from the figures in the cited documents, the springs used require space between the structure that must pivot (and to which the first end of the spring is attached) and a support structure (to which the second end of the spring is attached. With an out of plane spring, less space is required between the inner and outer frames as well as between the outer frame and the fixing to which an end of a spring is attached to a housing."

The inner and outer frame can be made of metal. High temperature plastics or ceramics can also be used.

The distal ends of the third and fourth flexible springs are preferably attached to a first and a second connector respectively. The first and second connectors can be formed integrally with the outer frame. This provides good strength and less parts to assemble.

The widths of the inner and out frame, first and second connectors, and first to fourth flexible springs can be arranged so that a flat surface is formed on either side of the device. This allows the devices to be made together in a stack followed by isolation of the individual devices.

The widths of the inner and outer frame, first and second connectors, and first to fourth flexible springs are arranged so that a surface of the inner and outer frame lie in the same plane with a surface of the first and second connectors respectively.

A further aspect of the present invention is a stack of devices as described above and in the claims. The stack of devices means that one device is manufactured integrally with a device underneath or above such that each device may be isolated from the stack by subtractive machining such as wire or laser cutting.

Embodiments of the present invention have few parts and can be made by manufacture by additive manufacturing such as 3D printing.

A housing can have the device as described above attached to it.

The first and second connectors can be attached to the housing.

The housing may also have one or more adjustment means, the adjustment means being configured to adjust elastic rotation of the inner frame with respect to the outer frame about a first axis and/or to adjust elastic rotation of the outer frame about a second axis orthogonal with the first axis.

In another aspect of the present invention a method for making a device for elastic pivoting about two orthogonal axes using additive manufacturing is described, comprising the steps:

forming:

an inner frame concentric with an outer frame, a first and a second flexible spring element, the first and second flexible spring elements each having proximal and distal ends, the proximal end of the first spring element being integrally formed with the inner frame and the distal end of the first spring element being integrally formed with the outer frame and being located diagonally opposite to the second spring element, the proximal end of the second spring element being integrally formed with the inner frame and the distal end of the second spring element being integrally formed with the outer frame, a third and a fourth flexible spring element, the third and fourth flexible spring elements each having proximal and distal ends, the proximal end of the third spring element being integrally formed with the outer frame and being located diagonally opposite to the fourth spring element, the proximal end of the fourth spring element being integrally formed with the outer frame, the first to fourth flexible spring elements being placed so that the first and second flexible spring elements provide elastic rotation of the inner frame with respect to the outer frame about a first axis and the third and fourth flexible spring elements provide elastic rotation of the outer frame about a second axis orthogonal with the first axis.

The method preferably includes attaching distal ends of the third and fourth flexible springs to a first and a second connector respectively. These first and second connectors can be attached to the housing.

The method can include making a plurality of devices in a stack and the stack is sawn to isolate individual devices.

DEFINITIONS

Three-dimensional printing, more generally called "additive manufacturing", generally refers to a process for generating a 3D object by controlled additive or layered manufacturing methods. Layered manufacturing refers to sequential addition of material layers or joining together material layers or parts of material layers to form a 3D structure. The process may be controlled by an automated system or manually or a combination of the two. 3D printing can include fusing, sintering, or melting materials layer-by-layer. The layers can be hardened. The material used in the printing can be powder or liquid. 3D printing is generally distinguished over vapour deposition because the deposition from a vapour does not occur in controlled, defined layers but applies a coat. 3D printing therefore refers to a process used to create a three-dimensional object in which layers of material having controlled extents are formed sequentially typically under computer control. The generic term is additive manufacturing and this term will be used when describing the present invention. Additive manufacturing refers to a machine moving through a 3D work envelope transforming a mass of raw material into a desired shape layer by layer. The transforming the raw material can include sintering, melting, uniting, coalescing, amalgamating, binding, adhering, or chemical bonding such as covalent bonding. Other names for additive manufacturing include rapid prototyping, solid freeform fabrication, direct material deposition. The process of transforming of the raw material can comprise extrusion, wire, powder, laminated, polymerization by energy beams such as light, e.g. laser, powder bed and jetting or spraying additive manufacturing. Extrusion additive manufacturing can comprise any of robo-casting, fused deposition modelling (FDM) and fused filament fabrication (FFF). Wire additive manufacturing can comprise electron beam freeform fabrication (EBF3). Powder additive manufacturing can comprise direct metal laser sintering (DMLS), electron beam melting (EBM), selective laser melting (SLM), selective heat sintering (SHS), or selective laser sintering (SLS). Powder bed and jetting additive manufacturing can comprise plaster-based additive manufacturing (PP). Laminated additive manufacturing can comprise laminated object manufacturing (LOM). Light polymerized additive manufacturing can comprise stereo-lithography (SLA), digital light processing (DLP), or laminated object manufacturing (LOM).

Raw material refers to a material before it has been transformed by the additive manufacturing process. The raw material may be a solid, semi-solid, or liquid. The raw material can be a powder. If the raw material is a liquid a surface layer of the liquid may be transformed after which the object is lowered and the next layer transformed. Hence, a first layer can be transformed, and thereafter a volume of a raw material is provided on the first layer as a separate layer or parts thereof. Each additional subsequent layer or part thereof is provided on the previous layer by transforming at least a part of the raw material. Further processes may be applied to the transformed material such as hardening, such as solidifying by cooling or curing/cross-linking which can occur naturally without additional processing.

The skilled person is aware of apparatuses, systems which are available commercially for additive machining. Also software and controllers executing the software are available to prepare print files for the formation of 3D objects by additive manufacturing as well as to carry out the process of additive manufacturing. During the transformation the 3D object may be suspended in the raw material or may be supported, e.g. when forming overhangs which can reduce deformation of the 3D object during manufacture, e.g. by sagging, bending, cracking etc. The supports need not be parts of the 3D objects and, hence, have to be removed subsequently.

An individual layer of the 3D object can comprise a single type of material, such as made from a single elemental metal, or a single metal alloy as this makes the processing easier. However, a layer may comprise several different materials if the additive manufacturing method selected supports this.

For example, suitable polymeric raw materials may be PPS (polyphenylene sulphide), PEEK (polyether ether ketone), PEI (polyethylenimine), PSU (polysulfone), PI (polyimide), or PPE (poly(p-phenylene ether) or polyphenylene ether).

For example, a metal can be used such as Titanium or an alloy of Titanium for example TiAl6V4 or other grades which have been optimized especially for 3D printing e.g. in powder form, Aluminum or an alloy of aluminium for example AlSi10Mg or other grades which have been optimized especially for 3D printing e.g. in powder form, steel such as stainless steel, for example SS 316L, Maraging steel MS1, or other steels which have been optimized especially for 3D printing e.g. in powder form.

A metallic material (e.g., elemental metal or metal alloy) can comprise small amounts of non-metallic materials, such as, for example, oxygen, sulphur, or nitrogen. In some cases, the metallic material can comprise the non-metallic material in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (on the basis of weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (on the basis of weight, w/w) of non-metallic material. A trace amount can be any value between the afore-mentioned trace amounts (e.g., from about 10 parts per trillion (ppt) to about 100000 ppm, from about 1 ppb to about 100000 ppm, from about 1 ppb to about 10000 ppm, or from about 1 ppb to about 1000 ppm).

The term "bowed" means bent in a form reminiscent of how a bow is bent. "Bowed" does not require the cross-sectional area to be the same at all points of the bow, nor does it require that the radius of curvature is the same at each point. The term "arcuate" means comprising arcs, i.e. bent portions. "Arcuate" does not require the cross-sectional area to be the same at all points, nor does it require that the radius of curvature is the same at each point. However for bowed and arcuate flexible springs it is preferred if the radius of curvature remains constant along its length. "Arcuate" includes springs in the form of a helix, a spiral, are any form of a plurality of connected arcs. The first to fourth flexible spring elements are bowed or arcuate and extend out of the plane formed by the associated inner or outer frame. The arcuate or bowed form of the first to fourth spring elements creates for each element an arch that either extends between the inner frame and the outer frame or between the outer frame and a housing with the top of the arch not in the same plane as the first or second frame respectively. This has the advantage that the outer periphery of the inner frame can be very close to the inner surface of the outer frame. Also the outer surface of the outer frame can be close to the inner wall of the housing. If any of the first to fourth spring elements were in the same plane as the first or second frame then it or they would need to be accommodated in a space between the inner and outer frame or between the outer frame and the inner wall of the housing.

DETAILED DESCRIPTION OF THE ILLUSTRATIVE EMBODIMENTS THE INVENTION

The present invention will be described with respect to particular embodiments and with reference to certain drawings but the invention is not limited thereto but only by the claims.

The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, horizontal, vertical and the like in the description and the claims are used usually to describe a carpet that is laid horizontally unless another meaning is assigned to them.

In the drawings, like reference numerals indicate like features; and, a reference numeral appearing in more than one figure refers to the same element.

The present invention relates to a device 1 for elastic pivoting about two orthogonal axes and a method of manufacturing thereof. The design of the device is suitable for manufacture by additive manufacturing. With reference to FIGS. 1 to 12, a device 1 comprises an inner frame 10 concentric with an outer frame 20. The inner and outer frame can be manufactured by additive manufacturing. The inner and or outer frames 10, 20 can be polygonal, such as triangular, quadratic, hexagonal or can be arcuate in form such as circular, semi-circular, a sector of a circle, elliptical or a sector of an ellipse. The inner and or outer frames 10, 20 are preferably convex meaning that any inner included angle is less than 180°. Diagonals of the inner and or outer frames 10, 20 preferably stay within the inner and or outer frames 10, 20.

The device 1 has first and a second flexible spring elements 12, 14. The first and second flexible spring elements 12, 14 can be made by additive manufacturing with the inner frame 10 so that the ends of flexible spring elements 12, 14 are formed integrally with the frames 10 by additive manufacture. The first and second flexible spring elements 12, 14 each have proximal and distal ends 11, 21. The proximal end of foot 11 of the first spring element 12 is integrally formed with the inner frame 10, e.g. as a result of additive manufacturing. The distal end 21 of the first spring element 12 is integrally formed with the outer frame 20 e.g. as a result of additive manufacturing. Located diagonally opposite to the first spring element 12 on the inner frame 10 is the second spring element 14, the proximal end 13 of the second spring element 14 being integrally formed with the inner frame 10 and the distal end 22 of the second spring element 14 being integrally formed with the outer frame 20, e.g. as a result of additive manufacturing.

Device 1 also has third and fourth flexible spring elements 24, 27, the third and fourth flexible spring elements 24, 27 each having proximal and distal ends, the proximal end 23 of the third spring element 24 being integrally formed with the outer frame 20, e.g. as a result of additive manufacturing. Located diagonally opposite to the third spring 24 is the fourth spring element 27, the proximal end 26 of the fourth spring element 24 being integrally formed with the outer frame 20, e.g. as a result of additive manufacturing.

Figure 1:
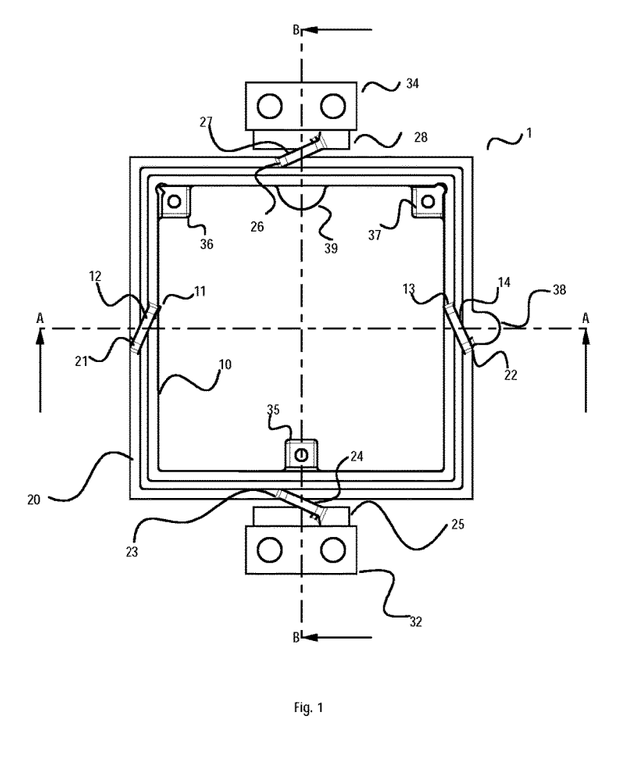
FIGS. 1 to 5 show different views of a device for elastic pivoting about two orthogonal axes according to an embodiment of the present invention.
Figure 2:
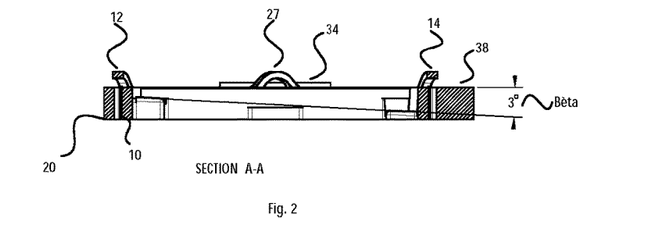
Figure 3:
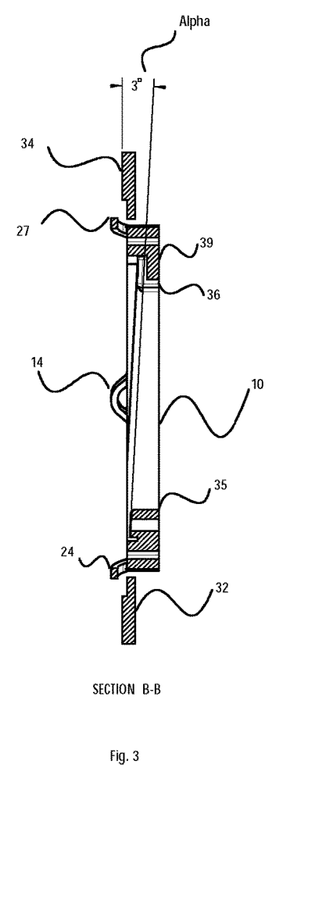
Figure 4:
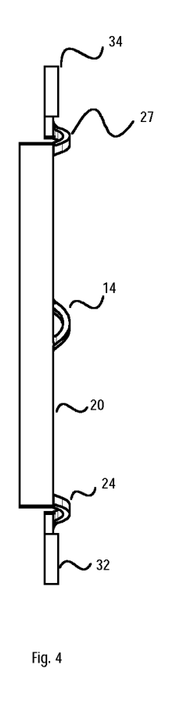

As shown in FIGS. 1-3 the first and second flexible spring elements 12, 14 lie on a line A-A and the third and fourth flexible spring elements 24, 27 lie on a line B-B. Line A-A is perpendicular to B-B. Line A-A bisects the length of the left hand side of frames 10, 20. The line B-B bisects the length of the right hand side of frames 10, 20. The first to fourth flexible spring elements 12, 14, 24, 27 are shaped and placed so that the first and second flexible spring elements 12, 14 provide elastic rotation of the inner frame 10 with respect to the outer frame 20 about a first axis (which is along line A-A) and the third and fourth flexible spring elements 24, 27 provide elastic rotation of the outer frame 20 about a second axis (along B-B) orthogonal with the first axis.

Any or all of the first to fourth flexible spring elements 12, 14, 24, 27 can be bowed or arcuate in form including the shape of an arc of a circle, semi-circular, an arc of an ellipse, a helix or a spiral or other shapes that include a plurality of arcs. The first to fourth flexible bowed or arcuate spring elements 12, 14, 24, 27 preferably have a radius of curvature at any point which is constant or which is larger in the centre rather than at one or both ends or which is smaller in the centre rather than at one or both ends. Preferably there is no step-wise change of radius of curvature or kink or angled section in the first to fourth flexible spring elements 12, 14, 24, 27 which can function as a stress raiser thus shortening working life by fatigue. The cross-sectional area of each of the first to fourth flexible bowed or arcuate spring elements 12, 14, 24, 27 may be constant along their length or may vary. For example, the cross-sectional areas at the end or feet 11, 21, 13, 22, 23, 26 can be thicker than in the centres of first to fourth flexible bowed or arcuate spring elements 12, 14, 24, 27.

Any or all of the first to fourth flexible spring elements 12, 14, 24, 27 can be semi-rectangles, semi-trapezoids, etc. The first to fourth flexible spring elements 12, 14, 24, 27 do not need to have a radius of curvature at any point which is constant or which is larger in the centre rather than at one or both ends or which is smaller in the centre rather than at one or both ends. There can be a step-wise change of radius of curvature or kink or angled section in the first to fourth flexible spring elements 12, 14, 24, 27, e.g. at the corners of the be semi-rectangles, semi-trapezoids, etc. To prevent this being a stress raiser the cross-sectional area of each of the first to fourth flexible spring elements 12, 14, 24, 27 may be increased at the kink or angled section(s). For example the cross-sectional are at the centre of each flexible spring can be thinner than at the kink or angled section(s). By increasing the thickness at the kink or angled section(s), the spring in that region becomes stiffer which pushes the stress and strain away from the kink or angled section(s) which results in distributing the stress and strain, i.e. providing strain relief.

The term concentric preferably refers to the inner and or outer frames 10, 20 not touching each other except for the junctions formed by the first and second flexible spring elements 12, 14.

The inner frame 10 is preferably concentric with an outer frame 12, The first to fourth flexible spring elements 12, 14, 24, 27 as shown in FIGS. 1, 2, 3, 4, 5 extend away from the associated inner or outer frame 10, 20 and out of a plane formed by the associated inner or outer frame 10, 20. The arcuate or bowed form of the first to fourth spring elements 12, 14, 24, 27 create for each element an arch that either extends like a bridge between the inner frame 10 and the outer frame 20 or between the outer frame 20 and a connector or a housing with the top of the arch not in the same plane as the first or second frames 10, 20 respectively. This has the advantage that the outer periphery of the inner frame 10 can be optionally very close to the inner surface of the outer frame 20 as the spring elements 12 and 14 do not lie in the same plane as frames 10 and 20 hence no part of elements 12 and 14 is between the outer face of the periphery of frame 10 and the inner face of the outer frame 20. Also the outer face of the outer frame 20 can be close to the connectors or fixings 32, 34 or to the inner wall of a housing. If any of the first to fourth spring elements 12, 14, 24, 27 were in the same plane as the first or second frame 10, 20 then it or they would need to be accommodated in a space between the inner and outer frame or between the outer frame and the connectors or fixings 32, 34 or the inner wall of the housing.

Figure 5:
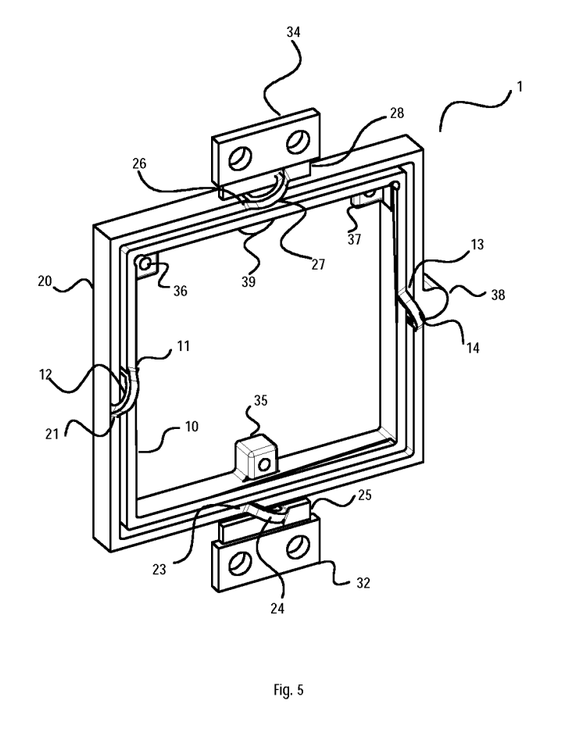
Figure 6:
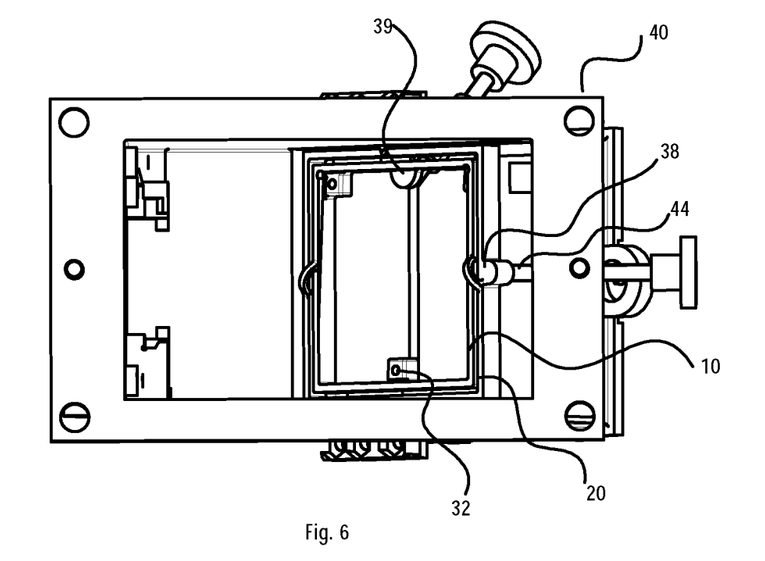
FIGS. 6 and 7 show a housing according to a further embodiment of the present invention for use with a device for elastic pivoting about two orthogonal axes.
Figure 7:
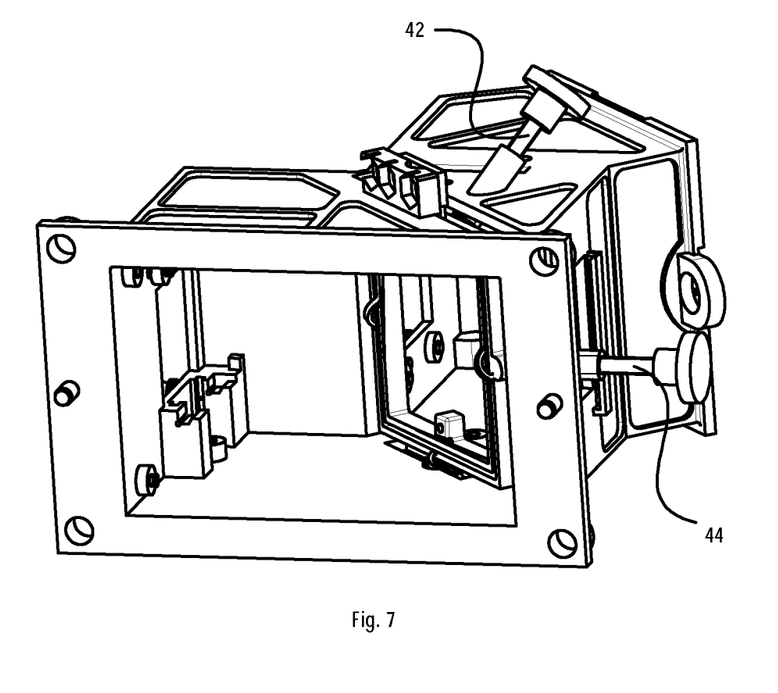

The out of plane arches formed by the spring elements 12, 14, 24, 27 can be seen in FIGS. 1 to 5, namely at least spring elements 12, 14, 27. Similarly, the out of plane arches formed by at least the spring elements 12, 14, 27 can be seen on FIGS. 4 and 5. Referring to FIGS. 6 and 7, the device 1 for elastic pivoting about two orthogonal axes can be located in a housing 40. The housing can also be made by additive manufacture. The distal ends 25, 28 of the third and fourth flexible spring elements 24, 27 are coupled to connected to or fixed to housing 40. Such a connector or fixing 32, 34 can be by any suitable attachment method such as with adhesive, a nut and bolt connection, screws, welding, soldering etc. The connector(s) or fixing or fixings 32, 34 is or are such that the third and fourth flexible spring elements 24, 27 provide elastic rotation of the outer frame 20 about a second axis orthogonal with the first axis. The connector(s) or fixing or fixings 32, 34 may be formed integrally with the distal ends 25, 28 of the third and fourth flexible spring elements 24, 27, e.g. by additive manufacturing. The connector(s) or fixing or fixings 32, 34 may include a plate suitable for adhering, bolting, screwing, welding or soldering to housing 40. For example, they may comprise a flat plate with one or two holes therein as shown in FIGS. 1 and 5.

The inner frame 10 may also have one, two, three or more connection points 35, 36, 37 for connecting a mirror for example. These connections points 35, 36, 37 may be made by additive manufacturing as part of frame 10, i.e. integrally formed therewith. As shown in FIG. 1, connection points 36 and 37 are located in two corners of the inner frame 10. One connection point 35 is located at the middle of the side of inner frame 10 opposite to connections points 36, 37.

Contact surfaces can be provided by lugs 38, 39. Two adjustment means 42, 44 attached to the housing 40 (see FIGS. 6 and 7) can be adjusted independently in length to contact the contact surfaces provided on lugs 39, 38 to cause rotation of the inner frame about axis A-A and the outer frame about axis B-B, respectively. The adjustment means 42, 44 can be a bracket attached to housing 40 with a threaded hole through which a bolt 46, 48 can be threaded and by rotating the bolt 46, 48 bring the end of the bolt 46, 48 into contact with the contact surface(s) on lug 38 or lug 39. Instead of a bolt, other controllable actuators can be used such as a linear motor, a stepping motor with rack and pinion, a solenoid driven actuator, a hydraulic or pneumatic cylinder, etc.

As shown in FIG. 1 the device 1 is made in a planar form by additive manufacturing. The device 1 can therefore have the inner frame co-planar with the outer frame when the device is at rest or tension-free. Alternatively, the inner frame 10 may be made at an angle to the outer frame 12 by additive manufacture. If this angle is small such as less than 5 degrees it can be possible to manufacture the device 1 without supports. Otherwise, one or more supports may be necessary to support any overhanging part which could distort without the supports. The supports can be removed after the additive manufacturing is complete, e.g. manually.

The final device made by additive manufacturing from metal before fixing to the housing 30 is shown in FIG. 5.

Figure 8:
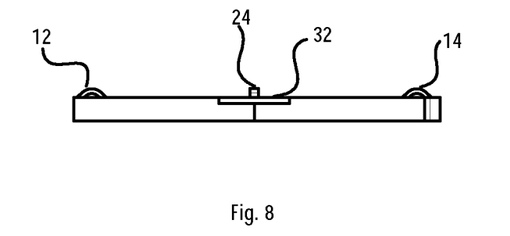
FIGS. 8 and 9 show different views of a device for elastic pivoting about two orthogonal axes according to another embodiment of the present invention.
Figure 9:
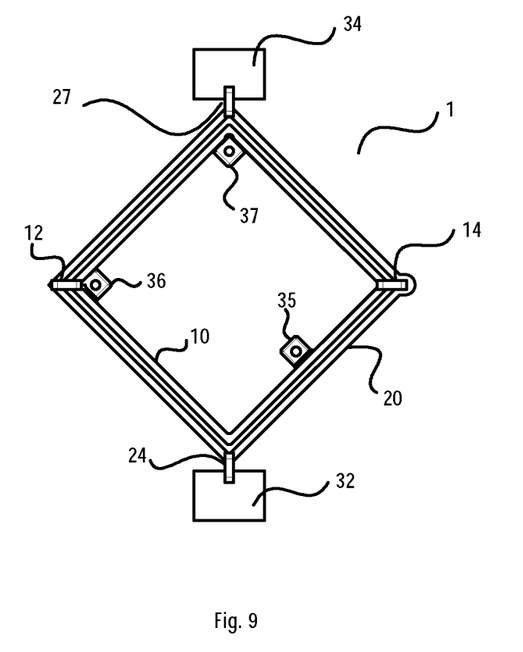

FIGS. 8 and 9 show a device 1 wherein the fixings or connectors 32 and 34 are placed at the corners of the outer frame and not along the edges. The flexible spring elements 12, 14, 24, 27 are then placed at the four corners, respectively. The fixings or connectors can be located at other position. The out of plane arches formed by the spring elements 12, 14, 24, 27 can be seen in FIG. 8, namely at least spring elements 12, 14 and elements 24, 27 in FIG. 10.

A device according to any of the embodiments of the present invention is manufactured in the following way. Three-dimensional additive manufacturing of a device 1 according to embodiments of the present invention can be done from electronic data defining device 1 or may be made from a physical model of device 1 which is then scanned into a computer. A physical model may be created with computer aided design or with a suitable scanner. The 3D scanning process can include analyzing and collecting digital data on the shape and appearance of a device 1. Based on this data, three-dimensional models of the scanned object can be produced.

The device 1 can be made with an additive process in which successive layers of material are laid down on top of each other. This process may be controlled preferably by a computer, but manual control or a combination of these can be used. A variety of materials can be used in the additive process including metal, metal alloy, ceramic or polymeric material. In an additive manufacture, a first material-layer is formed, e.g. by sintering with a laser followed successive material layers. Each new material layer is added on a previously formed material-layer, until the entire copy of the device 1 is obtained optionally including supports which are to be removed.

Various additive processes can be used such as those melt or soften material to produce the layers. Examples selective laser melting (SLM), selective laser sintering (SLS), direct metal laser sintering (DMLS) or fused deposition modelling (FDM).

At times, the printed 3D object may deform during the additive process and supports may be inserted to prevent such deformation. These supports are usually removed produce a copy of device 1.

A preferred method is DMLS which is a laser melting method sin which portions of a whole volume of powder are heated up more-or-less simultaneously to a temperature which allows a sintering and/or melting of these portions. The device 1 is made by many heating cycles of think layers of powder. Solidification of these powder portions is carried through selectively, i.e. at selected positions of layer of power, which positions correspond to portions of the device 1 to be manufactured. The process of solidification transformation is carried out layer by layer the solidified powder in each layer is identical with a cross-section of the device 1. A rapid cool-down after melting/softening is preferred so that the material solidifies quickly after heating.

Figure 10:
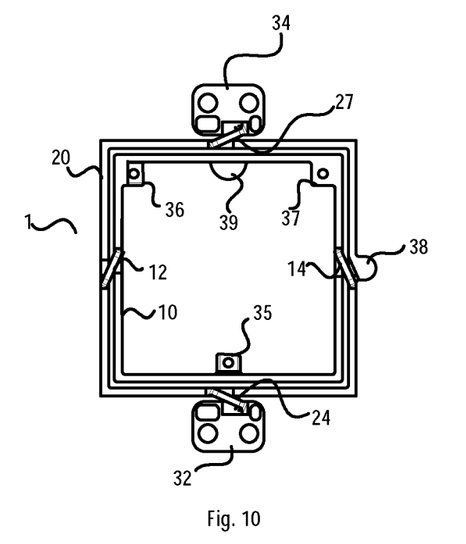
FIGS. 10 to 12 show different views of a device for elastic pivoting about two orthogonal axes according to yet another embodiment of the present invention.
Figure 11:
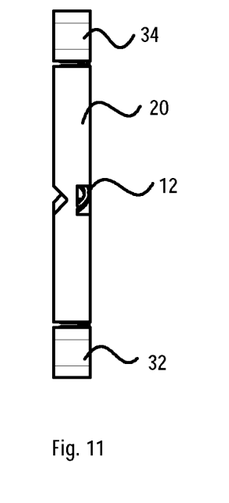
Figure 12:
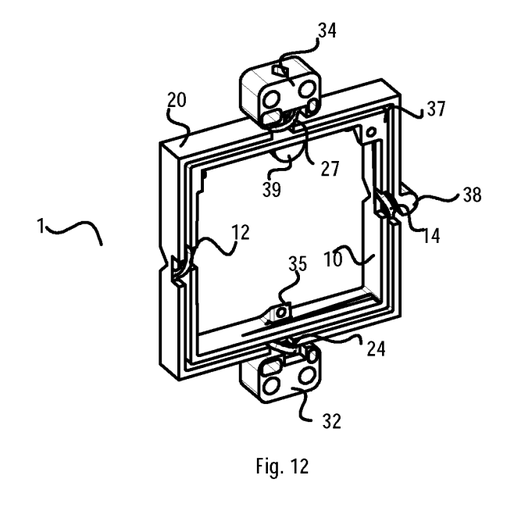

In order to speed up the process second device 1 can be formed immediately after a first device 1 and this repeated to form a stack of devices 1. These can then be separated from each other by a suitable sawing means such as a wire or laser cutter. In order to do this the device 1 should be designed so that there is a cutting plane across each side of a device 1 that can be cut without causing any functioning part to the cut as well. Such a device 1 is shown in FIGS. 10, 11, 12. In this device the spring elements 12, 14, 24, 27 are recessed and the fixings or connectors 32 and 34 are made thick enough such that their surfaces lie in the same plane with the frames 10, 20. Thus two major surfaces are generated, which allows one device 1 in a stack to be cut away from the neighbouring devices 1 by a cutting trajectory that does not cut through constitutive parts of device 1.

The invention claimed is:

1. A device for elastic pivoting about two orthogonal axes, comprising:
   an inner frame concentric with an outer frame,
   a first and a second flexible spring element, the first and second flexible spring elements each having proximal and distal ends, the proximal end of the first spring element being integrally formed with the inner frame and extending away from the inner frame and out of a plane in which the inner frame lies, and the distal end of the first spring element being integrally formed with the outer frame and extending away from the outer frame and out of a plane in which the outer frame lies, and being located diagonally opposite to the second spring element, the proximal end of the second spring element being integrally formed with the inner frame and extending away from the inner frame and out of the plane in which the inner frame lies, and the distal end of the second spring element being integrally formed with the outer frame and extending away from the outer frame and out of the plane in which the outer frame lies, a third and a fourth flexible spring element, the third and fourth flexible spring elements each having proximal and distal ends, the proximal end of the third spring element being integrally formed with the outer frame and extending away from the outer frame and out of the plane in which the outer frame lies, and being located diagonally opposite to the fourth spring element, the proximal end of the fourth spring element being integrally formed with the outer frame and extending away from the outer frame and out of the plane in which the outer frame lies, wherein the first to fourth flexible spring elements are placed so that the first and second flexible spring elements provide elastic rotation of the inner frame with respect to the outer frame about a first axis and the third and fourth flexible spring elements provide elastic rotation of the outer frame about a second axis orthogonal with the first axis.

2. The device according to claim 1, wherein any of the first to fourth spring elements are arcuate or bowed.

3. The device according to claim 1, wherein the inner frame is co-planar with the outer frame when at rest or tension-free.

4. The device according to claim 1, wherein the inner and outer frame are made of metal.

5. The device according to claim 1, wherein distal ends of the third and fourth flexible springs are attached to a first and a second connector respectively.

6. The device according to claim 5, wherein widths of the inner and outer frame, the first and second connectors, and the first to fourth flexible springs are arranged so that a flat surface is formed on either side of the device.

7. The device according to claim 5, wherein widths of the inner and outer frame, the first and second connectors, and the first to fourth flexible springs are arranged so that a surface of the inner and outer frame is coplanar with a surface of the first and second connectors respectively.

8. The device according to claim 1, wherein the device is manufactured by additive manufacturing.

9. A housing comprising the device of claim 1.

10. The housing according to claim 9, wherein first and second connectors are attached to the housing.

11. The housing according to claim 9, further comprising an adjustment means, the adjustment means being configured to adjust elastic rotation of the inner frame with respect to the outer frame about a first axis and/or to adjust elastic rotation of the outer frame about a second axis orthogonal with the first axis.

12. A method for making a device for elastic pivoting about two orthogonal axes using additive manufacturing, comprising the steps:

forming:
an inner frame concentric with an outer frame,
a first and a second flexible spring element, the first and second flexible spring elements each having proximal and distal ends, the proximal end of the first spring element being integrally formed with the inner frame and the proximal end of the first spring element extending away from the inner frame and out of a plane in which the inner frame lies, and the distal end of the first spring element being integrally formed with the outer frame and extending away from the outer frame and out of a plane in which the outer frame lies and being located diagonally opposite to the second spring element, the proximal end of the second spring element being integrally formed with the inner frame and extending away from the inner frame and out of the plane in which the inner frame lies and the distal end of the second spring element being integrally formed with the outer frame and extending away from the outer frame and out of the plane in which the outer frame lies, a third and a fourth flexible spring element, the third and fourth flexible spring elements each having proximal and distal ends, the proximal end of the third spring element being integrally formed with the outer frame and extending away from the outer frame and out of the plane in which the outer frame lies and being located diagonally opposite to the fourth spring element, the proximal end of the fourth spring element being integrally formed with the outer frame and extending away from the outer frame and out of the plane in which the outer frame lies, placing the first to fourth flexible spring elements in a way so that the first and second flexible spring elements provide elastic rotation of the inner frame with respect to the outer frame about a first axis and the third and fourth flexible spring elements provide elastic rotation of the outer frame about a second axis orthogonal with the first axis.

13. The method according to claim 12, further comprising attaching distal ends of the third and fourth flexible springs to a first and a second connector respectively.

14. The method according to claim 13, further comprising attaching the first and second connectors to a housing.

15. The method according to claim 12, wherein a plurality of devices are manufactured in a stack.

16. The method according to claim 15, wherein the stack is sawn to isolate individual devices.

* * * * *